(12) United States Patent
Williamson

(10) Patent No.: US 6,629,585 B2
(45) Date of Patent: Oct. 7, 2003

(54) VEHICLE BRAKING SYSTEM

(75) Inventor: Michael Williamson, Caerleon (GB)

(73) Assignee: ArvinMeritor, Inc., Troy, MI (US)

( * ) Notice: Subject to any disclaimer, the term of this patent is extended or adjusted under 35 U.S.C. 154(b) by 0 days.

(21) Appl. No.: 09/898,349

(22) Filed: Jul. 3, 2001

(65) Prior Publication Data
US 2002/0003069 A1 Jan. 10, 2002

(30) Foreign Application Priority Data
Jul. 4, 2000 (GB) .............................................. 0016271

(51) Int. Cl.⁷ .............................................. F16D 55/08
(52) U.S. Cl. ................ 188/72.1; 303/114.1; 303/117.1; 60/547.1; 60/583; 60/593; 188/72.4
(58) Field of Search ............................ 188/151 R, 72.1, 188/72.4, 152; 303/9.64, 117.1, 114.1; 60/547.1, 583, 593

(56) References Cited

U.S. PATENT DOCUMENTS

| | | | |
|---|---|---|---|
| 4,257,496 A | * | 3/1981 | Fujita et al. ................ 188/72.6 |
| 4,468,927 A | * | 9/1984 | Farr ........................... 60/547.1 |
| 4,702,330 A | | 10/1987 | Vatter et al. |
| 5,000,295 A | * | 3/1991 | Fargier ....................... 188/72.1 |
| 5,000,521 A | | 3/1991 | Majima et al. |
| 5,211,070 A | * | 5/1993 | Hirata et al. .................. 74/477 |
| 5,249,853 A | * | 10/1993 | Reinartz et al. ......... 303/114.1 |
| 5,462,137 A | | 10/1995 | Aubry et al. |
| 5,645,143 A | | 7/1997 | Mohr et al. |
| 5,700,067 A | | 12/1997 | Heubner |

FOREIGN PATENT DOCUMENTS

| | | | |
|---|---|---|---|
| FR | 2 704 505 A1 | 11/1994 | |
| GB | 2118652 A | * 11/1983 | ................ 60/547.1 |
| JP | 550115634 A | 9/1980 | |
| JP | 7-196066 | * 8/1995 | |

OTHER PUBLICATIONS

Search Report under Section 17 dated Sep. 24, 2001.
European Search Report completed Oct. 23, 2002.

* cited by examiner

Primary Examiner—Jack Lavinder
Assistant Examiner—Mariano Sy
(74) Attorney, Agent, or Firm—Carlson, Gaskey & Olds

(57) ABSTRACT

A vehicle braking system in which an annular piston brake and a booster to generate an amplified output force for actuating the brake are combined to form an integrated unit. The booster is mounted on an axle casing in which the piston brake is located so that the amplified force acts directly on fluid in a chamber to displace the piston brake. A self-bleeding facility for the brake fluid is provided via the booster.

18 Claims, 3 Drawing Sheets

VEHICLE BRAKING SYSTEM

This application claims priority to United Kingdom (GB) patent publication number GB 0016271.9 filed on Jul. 4, 2000.

BACKGROUND OF THE INVENTION

This invention concerns improvements in or relating to vehicle braking systems and in particular, though not exclusively, to braking systems for agricultural vehicles such as tractors and the like.

Agricultural vehicles are commonly provided with braking systems employing "annular piston brakes" in which fluid contained in an axle is pressurized when a brake pedal is depressed to actuate a piston to apply the brake to a rear wheel.

Normally, separate brake pedals are provided for applying the brakes to the rear wheels on opposite sides of the vehicle. In this way, the rear wheels can be braked independently to facilitate steering by depressing the brake pedal associated with the brake for that rear wheel or simultaneously for full vehicle retardation by depressing both brake pedals.

Agricultural vehicles, especially tractors, typically include a source of pressurized hydraulic fluid for operating ancillary equipment and it is known to employ this in a booster to boost an input force producing an amplified output force to actuate the brakes. In this way, braking performance, especially for full vehicle retardation, is enhanced.

The known boosters typically have a boost piston working in a bore in a body to apply an output force in response to a pressure applied to a power chamber under the control of a control valve in turn responsive to an input force.

The input force is that generated by actuation of the brake pedal which operates the control valve to connect the power chamber to the source of pressurized hydraulic fluid which acts to displace the boost piston and produce the amplified output force for actuating the brakes.

Conventionally, the boosters are installed at a remote location from the brakes and are typically mounted to the cab of the vehicle requiring long hydraulic pipe runs to and from the vehicle cab to connect the boosters to the brakes and the available supply of pressurized fluid.

Such pipe runs add to installation costs and lead to significant noise levels being generated by flow of hydraulic fluid along the pipe runs to and from the vehicle cab when the braking system is operated.

Furthermore, the pipe runs are often exposed and there is a risk of damage to the pipe runs with loss of hydraulic fluid and increased risk of injury from failure of the braking system.

Moreover, the remote location of the booster at the cab can lead to responsiveness and hysteresis problems with the relatively high volumetric consumption of some annular piston brakes.

SUMMARY OF THE INVENTION

The present invention has been made from a consideration of the foregoing problems and disadvantages of known braking systems.

Thus, it is an object of this invention to provide a braking system employing a booster to boost an input force and generate an amplified output force for actuating a brake in which the pipe runs connecting the booster to the brake are reduced and more preferably eliminated.

It is a further object of this invention to provide a braking system employing a booster in which the noise levels generated by operation of the braking system are reduced.

It is yet another object of this invention to provide a braking system employing a booster in which installation of the booster is simple and access to the booster for repair/maintenance is facilitated.

These and other objections of the invention are generally provided by an arrangement in which a booster for a brake is relocated from the cab to the brake for a wheel to be braked.

Thus, according to a first aspect of this invention there is provided a vehicle braking system including a booster to boost an input force and generate an amplified output force to actuate a brake for a wheel of the vehicle in which the booster and brake are combined in an integrated unit.

By combining the booster with the brake, the output force from the booster acts directly to actuate the brake. In this way, long pipe runs to connect the booster to the brake are eliminated and operating noise levels are reduced. Also, the responsiveness and hysteresis problems of existing cab mounted boosters are substantially eliminated.

Moreover, a simple actuation system may be employed for the booster such as a brake pedal operating a master cylinder to provide the input force to the booster.

Furthermore, a self-bleeding facility for the brake hydraulics may be provided via the booster. This has particular benefit for application of the invention to hydrostatic drives and simplifies connection to the available hydraulic supply.

Additionally, a pre-assembled axle assembly with integral hydraulic booster brakes may be provided. This has advantages for the manufacture, installation and subsequent maintenance of the axle assembly.

Preferably, the brake includes a piston slidable in a bore to apply the braking force under the control of fluid pressure in a chamber responsive to the amplified output force of the booster.

The brake may be an annular piston brake. In this case the chamber is provided within an axle casing for the wheel to be braked and the booster is mounted on the casing so that the amplified output force acts directly on the fluid in the chamber.

The booster may have a boost piston working in a bore to generate the amplified output force in response to a pressure applied to a power chamber under the control of a valve, in turn responsive to the input force. In this case, the valve controls communication between the power chamber and either one of a reservoir tank and a supply of pressurized fluid in response to the input force. For example, the valve may be arranged to control ports connecting the power chamber to the reservoir tank and the pressurized fluid supply.

Preferably, a reservoir port is open and a supply port closed in a rest or passive condition of the booster to isolate the power chamber from the fluid supply with the valve being operable to close the reservoir port and open the supply port in response to the input force to connect the power chamber to fluid supply In this way, the pressure of the fluid admitted to the power chamber advances the boost piston to boost the input force and generate the amplified output force for actuating the brake.

In a preferred arrangement, the valve comprises a spool working in a bore in the boost piston to control opening and closing of the ports connecting the power chamber to the reservoir and fluid supply in response to the input force acting on the spool.

Preferably, the spool is biased to a retracted position in the rest or passive condition of the booster and the input force acts to displace the spool against the biasing.

Advantageously, the biasing is provided by a return spring within the bore of the boost piston in which the spool works, and a stop is provided to limit movement of the spool and define an end position preventing further separation of the boost piston and spool under the biasing of the spring.

Preferably, the supply port is closed and the reservoir port is open when the spool engages the stop in the end position. For example, when both the boost piston and spool are in their retracted positions. In this way, the fluid pressure supply is isolated from the power chamber when the spool engages the stop.

Advantageously, the booster is provided with a bleed hole connecting the chamber to the reservoir tank in the rest or passive condition of the booster, and the bleed hole is isolated from the chamber when the boost piston is advanced.

Preferably, the boost piston is biased to a retracted position in the rest or passive condition of the booster and the bleed hole connects the chamber to the reservoir tank when the boost piston is in the retraced position with initial movement of the boost piston from the retracted position isolating the bleed hole from the chamber. In this way, the chamber is self-bleeding when the brake is inoperative with the boost piston retracted.

The preferred position of the booster for the chamber to be self-bleeding is at the top of the chamber with the booster extending vertically. The booster may be arranged to extend other than vertically depending on the available space and other requirements of the installation. For example, the booster may be arranged to extent at an angle up to 90° from the vertical, i.e., almost horizontally.

According to a second aspect of the invention, there is provided a booster for a vehicle braking system having a boost piston working in a bore and adapted to generate an output force in response to a pressure applied to a power chamber under the control of a valve which in turn is responsive to an input force wherein the booster is adapted for mounting on an axle having a piston working in a bore to apply a braking force in response to the output force generated by the booster.

According to a third aspect of the invention, there is provided a vehicle having a braking system according to the first and second aspects of the invention.

Preferably, the braking system is arranged to apply the braking force to a rear wheel on one side of the vehicle under the control of an actuation system such as a brake pedal operating a master cylinder to actuate the booster.

Advantageously, the vehicle has further rear wheel on the other side with a further braking system and actuation system for that wheel. In this way, full vehicle retardation is provided by operating both brake pedals simultaneously to apply the brakes on both sides while steering may be facilitated by operating either one of the brake pedals separately to apply the associated brake on that side only.

Other advantages of the axle mounted booster according to this invention include the capability to provide a simple master cylinder actuator from the cab to the booster in a pre-assembled axle assembly with integral hydraulic booster brake which is simple to install.

These and other benefits arising from the re-positioning of the booster from the cab to the brake will be further explained and described later herein with reference to an embodiment of the invented braking system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
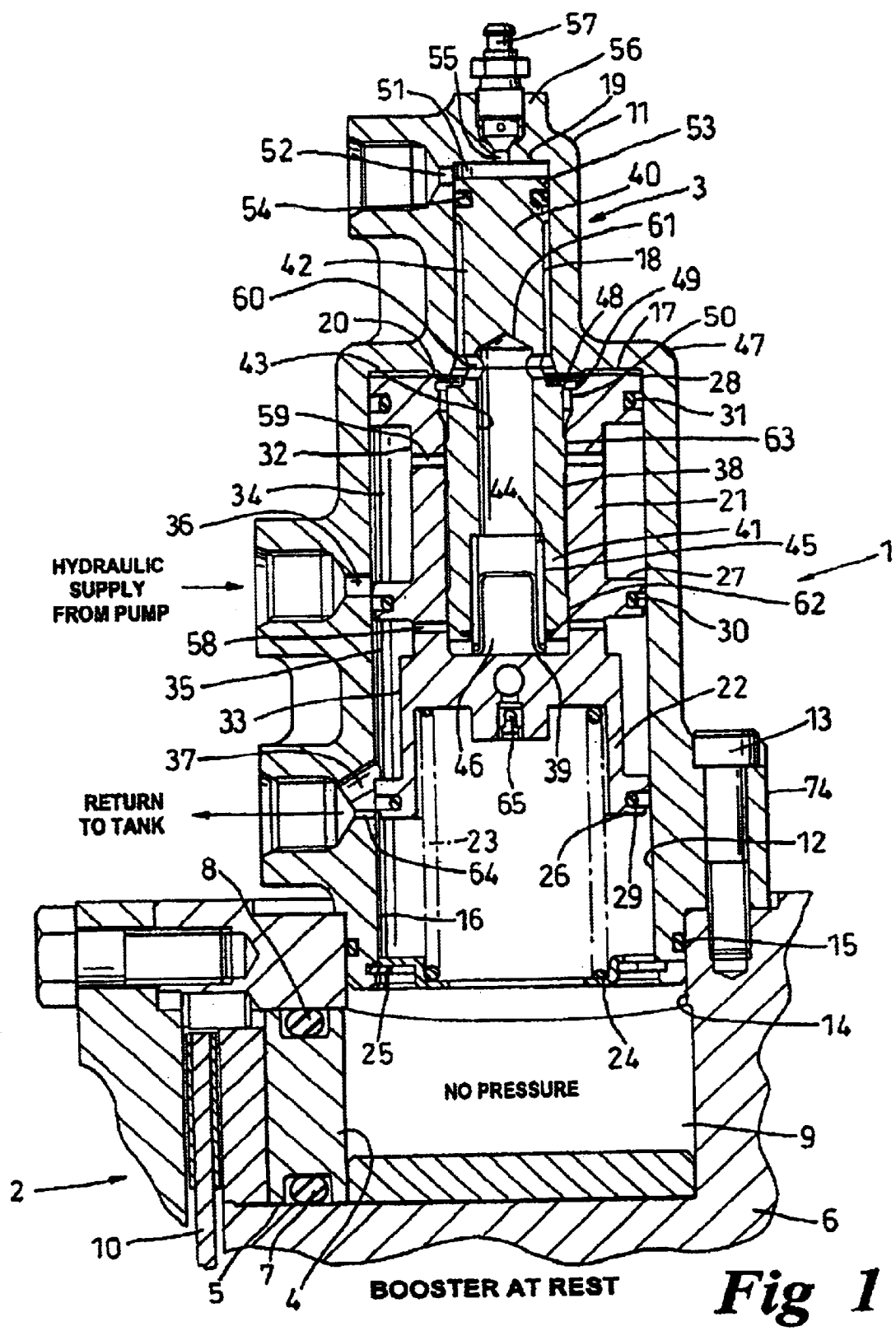
FIG. 1 is a vertical section through a brake and booster assembly of a vehicle braking system according to this invention with the booster shown in a passive or rest condition with the brake released.

Referring to the accompanying drawings there is shown a brake and booster assembly 1 for a braking system of a rear wheel (not shown) of an agricultural vehicle such as a tractor (not shown). The vehicle has a pair of rear wheels, one on each side, and each rear wheel has a respective brake and booster assembly The construction and operation of both assemblies 1 is the same and, for convenience, a detailed description of one assembly will now be given, it being understood that the description applies equally to the other assembly.

The assembly 1 comprises a brake 2 and a booster 3. The brake 2 is operable to apply a braking force to the rear wheel under the control of the booster 3 which in turn is responsive to an input force from an actuating system (not shown) to produce an amplified output force to actuate the brake 2.

In this embodiment, the brake 2 is an annular piston brake having a ring-shaped piston 4 working in a bore 5 within a casing 6 of an axle for the rear wheel. The piston 4 carries inner and outer seals 7 and 8 respectively to engage the bore 5 and seal a fluid chamber 9 within the casing 6. The piston 4 is operable to apply the braking force to a friction disc 10 associated with the real wheel in response to fluid pressure applied in the chamber 9.

The booster 3 has a body 11 with an internal bore 12 open at one end of the body 11. The body 11 is releasably secured to the casing 6 by the body 11. The body 11 is releasably secured to the casing 6 by bolts 13 (one only shown) extending through radial lugs 74 (one only shown) on the body to align the open end of the bore 12 with an aperture 14 in the top of the casing 6.

The aperture 14 communicates with the chamber 9 within the casing 6 and is sealed by a seal 15 carried by the end of the body 11 located in the aperture 14.

The bore 12 has a first bore portion 16 extending from the open end and terminating at an internal shoulder 17. The shoulder 17 leads to a second bore portion 18 of reduced cross-section and extends coaxially with the first bore portion 16 and terminates in an end wall 19. The shoulder 17 is formed with a raised annular collar 20 concentric with the second bore portion 18.

A boost piston 21 works in the first bore portion 16 and has a recessed portion 22 at the front end providing a seating for one end of a return spring 23. The other end of the return spring 23 seats against a mounting ring 24 retained by a circlip 25 located at the open end of the bore 12.

The spring 23 biases the boost piston 21 to the retracted position shown in FIG. 1 in which the rear end of the piston 21 seats against the collar 20 in a rest or passive condition of the booster 3 when the brake 2 is released as described later.

The boost piston 21 is slidable in the first bore portion 16 and has three axially spaced lands 26, 27, 28 provided with respective seals 29, 30, 31 to engage the first bore portion 16.

The lands 26, 27, 28 separate two external annular recesses 32, 33 which define an inlet chamber 34 and an outlet chamber 35 within the first bore portion 16.

The inlet chamber 34 permanently communicates with a radial port 36 in the wall of the body 11 which is connected to a supply (not shown) of high pressure hydraulic fluid.

The outlet chamber 35 permanently communicates with a radial port 37 in the wall of the body 11 which is connected to a reservoir tank (not shown) for hydraulic fluid at atmospheric pressure.

The boost piston 21 has an internal bore 38 extending from the rear end and terminating in an end wall 39. The bore 38 is of increased cross-section and coaxially aligned with the second bore portion 18.

A spool 40 of a control valve has a front end portion 41 working in bore 38 of the piston 21 and a rear end portion 42 working in second bore portion 18 of the body 11.

The front end portion 41 is slidable in the bore 38 and has an internal bore 43 opening to the bore 38 at the front end of the spool 40.

An internal abutment shoulder 44 within the bore 43 provides a seating for one end of a return spring 45. The other end of the return spring 45 is located on a support member 46 seated against the end wall 39.

In this way, the spring 45 biases the spool 40 to the retracted position shown in FIG. 1 in which an external shoulder 47 engages a stop ring 48 located in an internal groove 49 of a counterbore 50 at the outer end of bore 38 in the rest or passive condition of the booster 3.

In this condition, the rear end portion 42 of the spool 40 is spaced from the end wall 19 and defines an inlet chamber 51 within the second bore portion 18 which communicates with a radial port 52 in the wall of the body 11.

The port 52 is connected to the actuation system (not shown) for the brake associated with the booster 3. For example, the actuation system may comprise a master cylinder responsive to operation of a brake pedal to deliver hydraulic fluid to the inlet chamber 51.

The rear end portion 42 is slidable in the second bore portion 18 and has a land 53 provided with a seal 54 to engage the second bore portion 18 and seal the inlet chamber 51.

The inlet chamber 51 also communicates with an axial port 55 in end wall 18 opening to a threaded bore 56 in which a bleed screw 57 is mounted. The bleed screw 57 normally closes the port 55 and can be adjusted to open the port 55 to allow bleeding of the inlet chamber 51 when required.

The boost piston 21 has a first set of circumferentially-spaced radial ports 58 adjacent the end wall 39, and a second set of circumferentially spaced radial ports 59 axially spaced from the first set.

The first set of ports 58 connect the outlet chamber 35 to the inner end of the bore 38, and the second set of ports 59 connect the inlet chamber 34 to the outer end of the bore 38.

Figure 2:
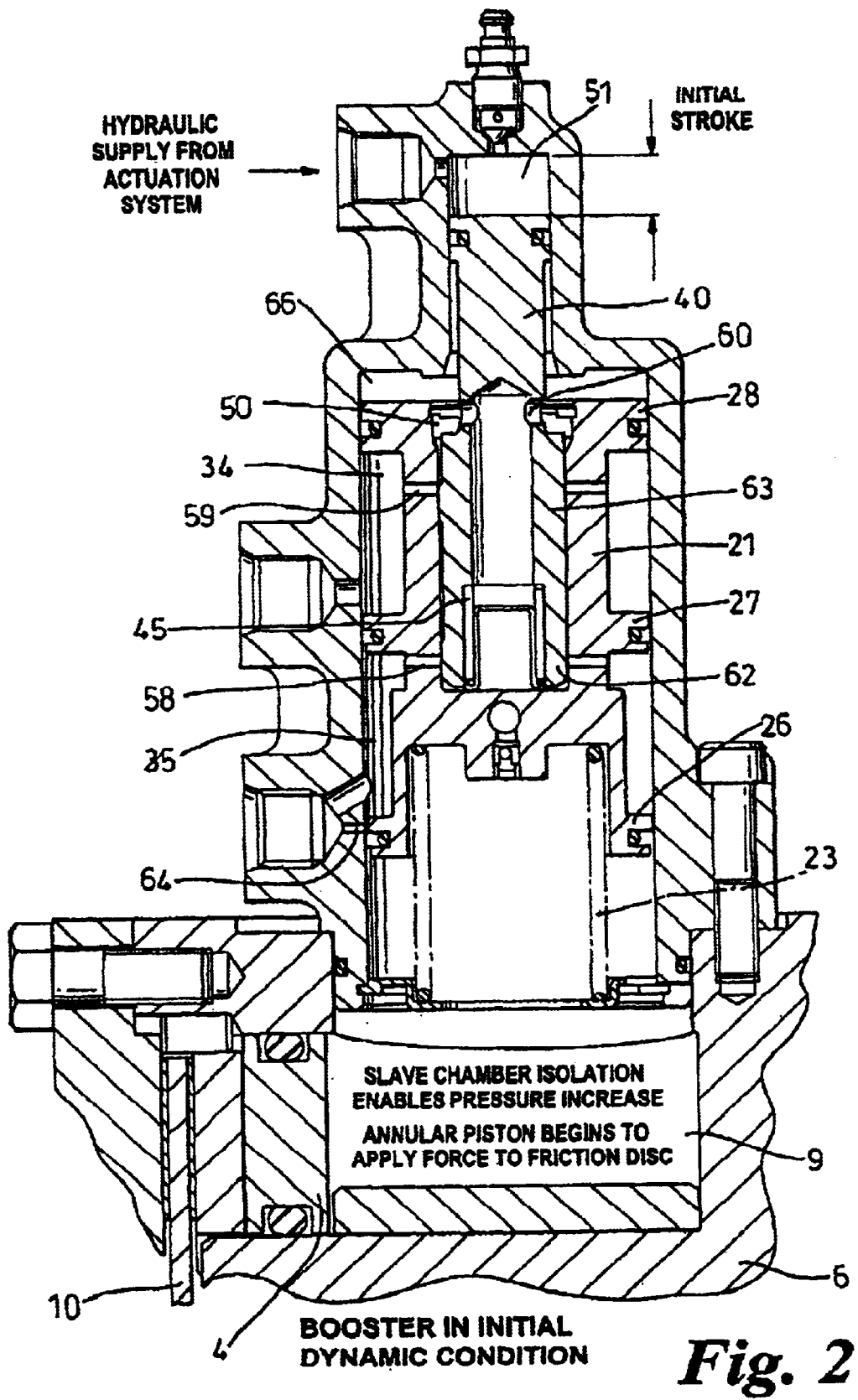
FIG. 2 is a vertical section similar to FIG. 1 showing the booster in an initial dynamic condition on application of the brakes.

The spool 40 has a set of circumferentially spaced radial ports 60 adjacent an end wall 61 of the bore 43. The ports 60 connect the bore 43 to a power chamber 66 (see FIGS. 2 and 3) for the boost piston 21 at the outer end of bore 38. The power chamber 66 is defined by the annulus between the diameters of the boost piston 21 and the spool 40 in the first bore portion 16.

The spool 40 also has first and second axially spaced lands 62 and 63 respectively on the front end portion 41.

The first land 62 is co-operable with the first set of ports 58 to control flow of fluid between the power chamber 66 and the reservoir tank via ports 60, bore 43 and the outlet chamber 35.

The second land 63 is co-operable with the second set of ports 59 to control fluid flow between the power chamber 66 and the source of pressurized fluid via counterbore 50 and inlet chamber 34.

In the rest or passive condition of the booster 3 shown in FIG. 1, both the boost piston 21 and spool 40 are biased to their retracted positions. The land 62 is clear of the first set of ports 58 to connect the power chamber 66 to the reservoir tank, and the land 63 closes the second set of radial ports 59 to isolate the power chamber 66 from the source of pressurized fluid.

In this condition, the chamber 9 communicates with the reservoir tank via a radial bleed hole 64 in the wall of the body 11 which is open in the retracted position of the boost piston 21 and by-passes the outlet chamber 35.

The chamber 9 also communicates with the outlet chamber 35 via a normally open one-way valve 65 in the recessed portion 22 at the front end of the boost piston 21 and from there with the reservoir tank.

In this way, the fluid pressure in the chamber 9 is substantially atmospheric pressure in the rest or passive condition of the booster 3. As a result, the brake 2 is released with the piston 4 in an inoperative position clear of the friction disc 10 associated with the rear wheel as shown in FIG. 1.

When the pedal of the actuating system for the brake 2 is depressed to apply the brake, hydraulic fluid enters the inlet chamber 51 of the second bore portion 42 behind the spool 40.

The spool 40 is advanced against the biasing of return spring 45 causing the first land 62 on the front end portion 41 of the spool 40 to close the first set of radial ports 58 isolating the power chamber 66 from the reservoir tank.

After the radial ports 58 are closed, the spool 40 continues to advance under the actuating force applied to inlet chamber 51. The front end portion 41 of the spool 40 moves towards end wall 39 of the boost piston 21 and the pressure of the hydraulic fluid causes the boost piston 21 to advance with the spool 40 against the biasing of return spring 23.

This closes bleed hole 64 and increases the fluid pressure in the chamber 9 so that the one-way valve 65 closes. As a result, the chamber 9 is isolated from the reservoir tank and increase in fluid pressure in the chamber 9 displaces the piston 4 to apply a braking force to the friction disc 10 in an initial dynamic condition of the booster 3 shown in FIG. 2.

At the same time, the second land 63 on the front end portion 41 of the spool 40 opens the second set of radial ports 59. This allows high pressure fluid in the inlet chamber 34 to enter the power chamber 66 via counterbore 50.

The high pressure fluid admitted to the power chamber 66 advances the boost piston 21 so that the pressure of the fluid in the chamber 9 is increased to boost the braking force applied by the piston 4 to the friction disc 10.

The bore 43 in the spool 40 communicates with the power chamber 66 via the ports 60 and received the high pressure fluid admitted to the power chamber 66. This acts on end wall 39 of the boost piston 21 and also pushes back on the input force applied to the spool 40.

Figure 3:
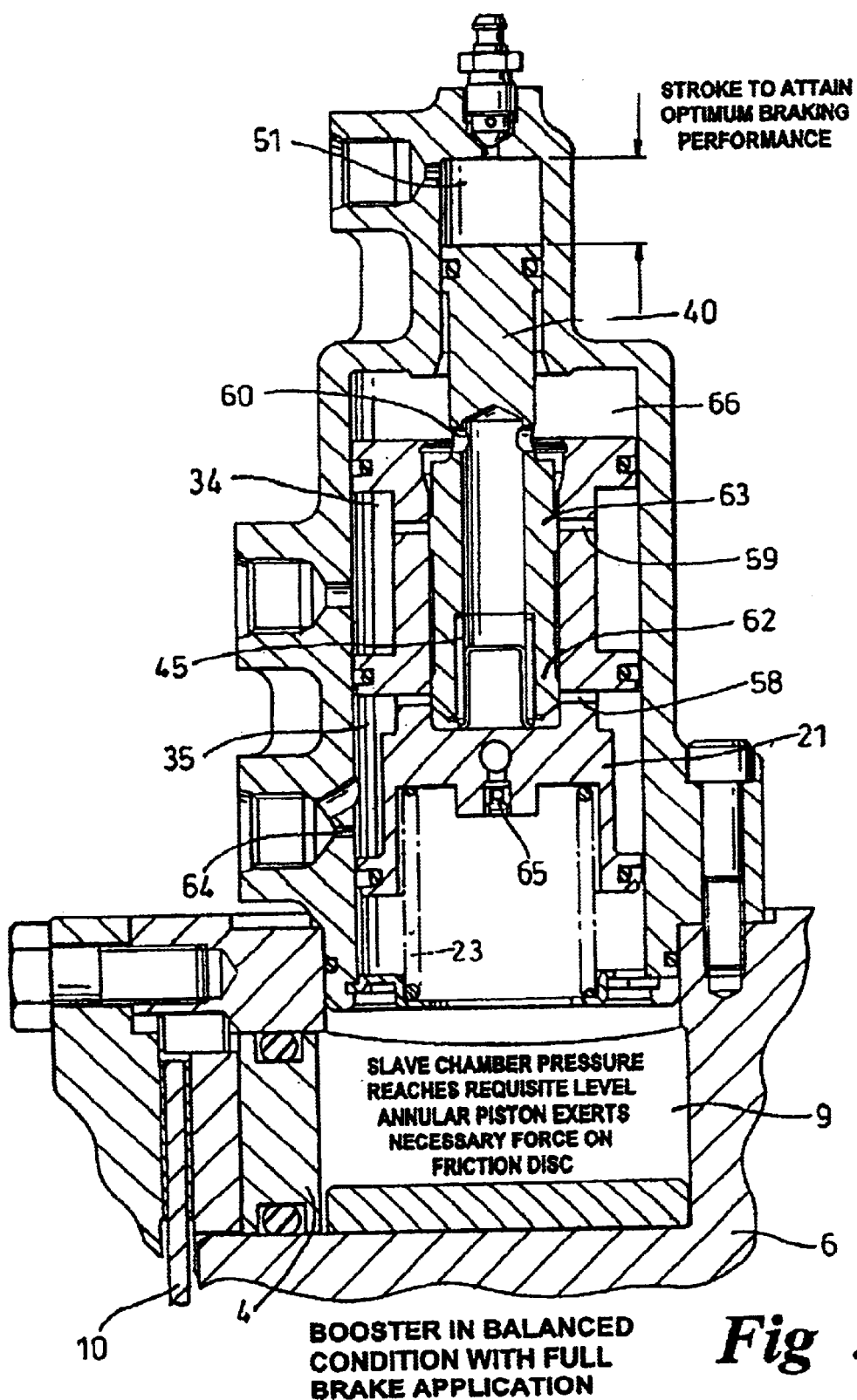
FIG. 3 is a vertical section similar to FIG. 1 showing the booster in a balanced condition on full application of the brake.

As a result, the boost piston 21 and spool 40 can be controlled so that, when full braking force is applied to the friction disc 10, the booster 3 is in a balanced condition shown in FIG. 3. In this condition, the spool 40 is positioned so that the lands 62 and 63 close both the first and second sets of the radial ports 58 and 59 to isolate the power chamber 66 from both the inlet chamber 34 and the outlet chamber 35.

In the balanced condition, movement of the spool 40 in one direction admits high pressure fluid from the inlet chamber 34 to the power chamber 66 while movement in the opposite direction releases high pressure fluid from the power chamber 66 to the outlet chamber 35.

In this way, the spool 40 can feather to open and close the ports 58, 59 to maintain the boost pressure in the slave chamber 9 to apply full braking force to the friction disc 10 while the pedal is depressed without requiring a continuous supply of high pressure fluid to the power chamber 66.

When the pedal of the actuating system is released, the pressure in the inlet chamber 51 falls and the spool 40 begins to retract under the biasing of return spring 45 As a result, the first land 62 clears the first set of radial ports 58 which are opened allowing the fluid pressure in the power chamber 66 to escape to the reservoir tank via bore 43 and outlet chamber 35. At the same time, the second set of radial ports 59 are closed by the second land 63 to isolate the power chamber 66 from the high pressure fluid source.

As a result, the pressure in the power chamber 66 is relieved and the boost piston 21 also retracts under the biasing of return spring 23. This causes the pressure in the chamber 9 to fall reducing the braking force applied by the piston 4 to the friction disc 10.

At the same time, the one-way valve 65 opens to connect the chamber 9 to the reservoir tank via outlet chamber 35 to relieve the pressure in the chamber 9. This allows the piston 4 to retract releasing the brake 2 and, when the boost piston 21 and spool 40 return to their fully retracted positions, the bleed hole 64 is opened allowing the chamber 9 to communicate directly with the tank reservoir again in the rest or passive condition of the booster 3.

As will now be appreciated, combining the brake 2 and the booster 3 in an integrated unit with the booster 3 mounted directly on the axle casing 6 eliminates the hydraulic pipe runs to and from the cab previously employed to connect a cab mounted booster to the brake. Moreover, operation of the brake 2 by the booster 3 is enhanced with improved responsiveness and reduced hysteresis compared to the conventional cab mounted booster operation of the brake. Also, operation of the booster 3 can be achieved with simple master cylinder actuation from the cab to the booster 3.

As a result, operating noise levels are significantly reduced, installation is simplified and maintenance is facilitated. Also, the problems and risks arising from damage to the hydraulic pipe runs to and from the cab in existing arrangements is eliminated. Thus, the benefits and advantages of invention are readily obtained where the brake and booster assembly above described is supplied and fitted as a pre-assembled axle assembly.

A further benefit of combining the brake 2 and booster 3 in this way, is the self-bleeding facility for the brake hydraulics via the bleed hole 64 which is open in front of the boost piston 21 in the rest or passive condition of the booster 3.

This may be achieved with different mounted positions of the booster 3 on the axle casing 6. Thus, the booster 3 may be mounted at the top of the casing 6 to extend vertically as described. Alternatively, the booster 3 may be mounted horizontally or at any intermediate position between horizontal and vertical.

The operation of the brake and booster assembly 1 for the rear brake on the other side of the vehicle is the same as that described above. As a result, both rear brakes can be operated simultaneously for full vehicle retardation by depressing the pedals of the associated actuating systems together. Alternatively, the rear brakes can be operated separately on one side of the vehicle to facilitate steering by depressing the pedal of the actuating system associated with the rear brake on that side only.

Although the invention has been described with reference to particular types of brake 2 and booster 3, it will be appreciated that the benefits and advantages of the invention can be obtained with other types and combinations of brake 2 and booster 3. Furthermore, any type of actuation system may be employed to produce the initial displacement of the spool 40 to operate the booster 3.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle braking system comprising:
   a brake for a wheel of a vehicle; and
   a booster to boost an input force and generate an amplified output force to actuate said brake, said booster and said brake combined in an integrated unit wherein said booster has a boost piston working in a bore to generate said amplified output force in response to a pressure applied to a power chamber under control of a valve, in turn, responsive to said input force; and
   wherein said valve controls communication between said power chamber and either one of a reservoir tank and a pressurized fluid supply in response to said input force.

2. A vehicle braking system according to claim 1, wherein said brake includes a piston slidable in a bore to apply the braking force under the control of fluid pressure in a chamber responsive to said amplified output force of said booster.

3. A vehicle braking system according to claim 2, wherein said brake is an annular piston brake and said chamber is provided within an axle casing for the wheel to be braked with said booster mounted on said casing so that said amplified output force acts directly on the fluid in said chamber.

4. A vehicle braking system according to claim 2, wherein said booster is arranged at the top of said chamber.

5. A vehicle braking system according to claim 4, wherein said booster extends vertically.

6. A vehicle braking system according to claim 4, wherein said booster extends at any angle up to about 90° from the vertical.

7. A vehicle braking system according to claim 1, wherein said valve is arranged to control ports connecting said power chamber to said reservoir tank and said pressurized fluid supply.

8. A vehicle braking system according to claim 7, wherein a reservoir port is open and a supply port closed in a rest or passive condition of said booster to isolate said power chamber from said pressurized fluid supply with said valve being operable to close said reservoir port and open said supply port in response to said input force to connect said power chamber to said pressurized fluid supply.

9. A vehicle braking system according to claim 8, wherein a pressure of a fluid admitted to said power chamber advances said boost piston to boost said input force and generate said amplified output force for actuating said brake.

10. A vehicle braking system according to claim 7, wherein said valve comprises a spool working in a bore in said boost piston to control opening and closing of said ports connecting said power chamber to said reservoir tank and said pressurized fluid supply in response to said input force acting on said spool.

11. A vehicle braking system according to claim 10, wherein said spool is biased to a retracted position in a rest or passive condition of said booster and said input force acts to displace said spool against said biasing.

12. A vehicle baking system according to claim 11, wherein said biasing is provided by a return spring within said bore of said boost piston in which said spool works, and a stop is provided to limit movement of said spool and define an end position preventing further separation of said boost piston and said spool under said biasing of said spring.

13. A vehicle braking system according to claim 12, wherein a supply port is closed and a reservoir port is open when said spool engages said stop in said end position.

14. A vehicle braking system according to claim 13, wherein said pressurized fluid supply is isolated from said power chamber when said spool engages said stop with both said boost piston and said spool in their retracted positions.

15. A vehicle baking system comprising:
a brake for a wheel of a vehicle; and
a booster to boost an input force and generate an amplified output force to actuate said brake, said booster and said brake combined in an integrated unit wherein said brake includes a piston slidable in a bore to apply a braking force under a control of a fluid pressure in a chamber responsive to said amplified output force of said booster; and
wherein said chamber is self-bleeding when said brake is inoperative.

16. A vehicle braking system according to claim 15, wherein said booster has a boost piston working in a bore to generate said amplified output force in response to a pressure applied to a power chamber under the control of a valve, in turn, responsive to the input force.

17. A vehicle braking system according to claim 15, wherein said booster is provided with a bleed hole connecting said chamber to a reservoir tank in a rest or passive condition of said booster, and said bleed hole is isolated from said chamber when said booster is actuated.

18. A vehicle braking system aaccording to claim 17, including a boost piston biased to a retracted position in said rest or passive condition of said booster and said bleed hole connects said chamber to said reservoir tank when said boost piston is in said retracted position with an initial movement of said boost piston from said retracted position isolating said bleed hole from said chamber.

* * * * *